(12) United States Patent
Henry et al.

(10) Patent No.: US 8,490,390 B2
(45) Date of Patent: Jul. 23, 2013

(54) EXHAUST FLOW SEGREGATOR AND ASSOCIATED SYSTEMS AND METHODS

(75) Inventors: Cary Henry, Columbus, IN (US); Aleksey Yezerets, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 206 days.

(21) Appl. No.: 12/870,502

(22) Filed: Aug. 27, 2010

(65) Prior Publication Data

US 2011/0047974 A1 Mar. 3, 2011

Related U.S. Application Data

(60) Provisional application No. 61/237,605, filed on Aug. 27, 2009.

(51) Int. Cl.
*F01N 3/36* (2006.01)
(52) U.S. Cl.
USPC .............................................. 60/303; 60/324
(58) Field of Classification Search
USPC ............................ 60/295, 301, 324, 288, 303
See application file for complete search history.

(56) References Cited

U.S. PATENT DOCUMENTS

| | | | |
|---|---|---|---|
| 6,601,385 B2 | 8/2003 | Verdegan et al. | |
| 6,722,123 B2 | 4/2004 | Liu et al. | |
| 6,871,490 B2 | 3/2005 | Liang et al. | |
| 7,509,799 B2 | 3/2009 | Amou et al. | |
| 2004/0050037 A1* | 3/2004 | Betta et al. | 60/286 |
| 2005/0013756 A1* | 1/2005 | Amou et al. | 423/239.1 |
| 2006/0257303 A1* | 11/2006 | Telford | 423/239.1 |
| 2007/0220867 A1* | 9/2007 | Clerc et al. | 60/288 |
| 2008/0041050 A1* | 2/2008 | Doring | 60/605.1 |
| 2008/0092526 A1 | 4/2008 | Kunkel et al. | |
| 2008/0102010 A1* | 5/2008 | Bruck et al. | 423/213.2 |

FOREIGN PATENT DOCUMENTS

| | | |
|---|---|---|
| JP | 2007-100635 A | 4/2007 |
| KR | 10-1995-0008921 A | 4/1995 |
| KR | 10-0763411 B1 | 10/2007 |

OTHER PUBLICATIONS

PCT/US2010/047000, International Search Results and Written Opinion, May 20, 2011.

* cited by examiner

*Primary Examiner* — Thomas Denion
*Assistant Examiner* — Jonathan Matthias
(74) *Attorney, Agent, or Firm* — Kunzler Law Group, PC

(57) ABSTRACT

According to one embodiment, an exhaust gas after-treatment apparatus includes an exhaust tube through which a main exhaust gas stream is flowable. The exhaust tube defines an exhaust flow channel. The apparatus also includes an exhaust flow segregator positioned within the exhaust tube. The exhaust flow segregator separates the exhaust flow channel into a first channel through which a first portion of the main exhaust gas stream is flowable and a second channel through which a second portion of the main exhaust gas stream is flowable. Additionally, the apparatus includes an injector coupled to the exhaust tube. The injector is communicable in reductant injecting communication with the first portion of the main exhaust gas stream flowing through the first channel. The apparatus also includes at least one exhaust gas heater communicable in heat supplying communication with the first portion of the main exhaust gas stream flowing through the first channel.

16 Claims, 4 Drawing Sheets

EXHAUST FLOW SEGREGATOR AND ASSOCIATED SYSTEMS AND METHODS

CROSS-REFERENCE TO RELATED APPLICATION

This application claims the benefit of U.S. Provisional Patent Application No. 61/237,605, filed Aug. 27, 2009, which is incorporated herein by reference.

FIELD

This disclosure relates to exhaust gas after-treatment systems, and more particularly to exhaust gas after-treatment systems with reductant injectors.

BACKGROUND

Diesel engines typically include exhaust gas after-treatment systems that receive and treat exhaust gas from the engine. Exhaust gas after-treatment systems can include many elements, but most commonly include at least one diesel oxidation catalyst (DOC), particulate matter filter, and selective catalytic reduction (SCR) system. The SCR system reduces nitrogen oxides ($NO_x$) present in the exhaust gas stream prior to the stream exiting the after-treatment system. In order to reduce $NO_x$, a reductant such as a urea solution or an ammonium formate solution is added to the exhaust gas before the exhaust gas reaches the SCR system. The reductant decomposes to produce a substance, such as ammonia, prior to passing through a catalyst of the SCR system. The ammonia, or other substance, reacts with $NO_x$ in the exhaust stream, in the presence of the SCR catalyst, to reduce $NO_x$ to less harmful emissions, such as $N_2$ and $H_2O$.

For proper operation, however, the reductant must decompose properly prior to entering the SCR catalyst. For proper decomposition of the reductant in an exhaust gas stream, the temperature of the exhaust gas stream must be at or above certain high temperature thresholds until decomposition is complete. During normal operating conditions, the temperature of the exhaust gas in isolated pockets can be sufficiently high to properly decompose the reductant. However, isolated cold spots or pockets in the exhaust gas where the exhaust gas temperatures are not sufficiently high to decompose the reductant are often present in the exhaust gas. If reductant is injected into such cold spots, un-decomposed reductant buildup and solidification on the reductant injector and/or walls of the after-treatment system may occur. Heating the entire exhaust system to prevent cold spots is not a cost-effective approach and in certain applications, may not be feasible due to design constraints.

A more efficient and effective apparatus, system, and method are needed to reduce cold spots in an exhaust gas stream into which a reductant is injected.

SUMMARY

The subject matter of the present application has been developed in response to the limitations of present state of the art concerning exhaust gas after-treatment systems. Accordingly, the subject matter of the present application has been developed to provide an apparatus, a system, and a method that overcomes at least some of the shortcomings of the present state of the art.

According to one embodiment, an exhaust gas after-treatment apparatus includes an exhaust tube through which a main exhaust gas stream is flowable. The exhaust tube defines an exhaust flow channel. The apparatus also includes an exhaust flow segregator positioned within the exhaust tube. The exhaust flow segregator separates the exhaust flow channel into a first channel through which a first portion of the main exhaust gas stream is flowable and a second channel through which a second portion of the main exhaust gas stream is flowable. Additionally, the apparatus includes an injector coupled to the exhaust tube. The injector is communicable in reductant injecting communication with the first portion of the main exhaust gas stream flowing through the first channel. The apparatus also includes at least one exhaust gas heater communicable in heat supplying communication with the first portion of the main exhaust gas stream flowing through the first channel.

In certain implementations, the exhaust flow segregator is a partition secured to an inner surface of the exhaust tube. The exhaust flow segregator can have a thin elongate sheet with an upstream end, a downstream end, and two sides extending between the upstream and downstream ends. The two sides can be secured to an inner surface of the exhaust tube such that the first channel is defined between the inner surface of the exhaust tube and a first surface of the sheet. Similarly, the second channel is defined between the inner surface of the exhaust tube and a second surface of the sheet. The first surface of the sheet can be a concave surface and the second surface of the sheet can be a convex surface.

According to some implementations, a cross-sectional area of the first channel is smaller than a cross-sectional area of the second channel. In certain implementations, the at least one exhaust gas heater of the apparatus is positioned within the first channel upstream of the injector. In yet certain implementations, the at least one exhaust gas heater is positioned within the first channel downstream of the injector. The at least one exhaust gas heater can be at least two exhaust gas heaters in some implementations. In such implementations, a first of the at least two exhaust gas heaters can be positioned within the first channel upstream of the injector and a second of the at least two exhaust gas heaters can be positioned within the first channel downstream of the injector.

In yet some implementations, the apparatus also includes a foam element positioned within the first channel downstream of the injector. The foam element can be made from a thermally conductive material and be in thermal contact with the at least one exhaust gas heater. The foam element may be configured to trap at least a portion of the reductant injected by the injector.

According to certain implementations, the apparatus can include a layer of insulation coupled to the exhaust flow segregator, such as between the first and second channels.

In yet another embodiment, an exhaust gas after-treatment system includes an exhaust gas treatment device and an exhaust gas line between an internal combustion engine and the exhaust gas treatment device. The exhaust gas line directs a main exhaust gas stream from the internal combustion engine to the exhaust gas treatment device for treatment. The system further includes a slipstream sleeve positioned within the exhaust gas line upstream of the exhaust gas treatment device. The slipstream sleeve divides the exhaust gas line into a slipstream exhaust channel and a bulk exhaust channel. Further, the system includes an exhaust gas heater positioned within the slipstream exhaust channel and a reductant injector communicable in reductant injecting communication with exhaust gas flowing through the slipstream exhaust channel.

The reductant injector can include a nozzle positioned external to the slipstream channel. In some implementations, the reductant injector includes a nozzle positioned within the slipstream channel. According to certain implementations, less than about 25% of the main exhaust gas stream flows through the slipstream channel. The exhaust gas treatment device can be a selective catalytic reduction catalyst and the reductant can be urea.

According to another embodiment, a method for treating exhaust gas includes separating a main exhaust gas stream into a first exhaust gas feed and second exhaust gas feed. The method also includes heating the first exhaust gas feed and injecting a reductant into the first exhaust gas feed. Further, the method includes combining the heated and reductant injected first exhaust gas feed and the second exhaust gas feed to form a modified main exhaust gas stream. Additionally, the method includes treating the modified main exhaust gas stream. In certain implementations, the method includes substantially fully decomposing the injected reductant in the first exhaust gas feed prior to combining the heated and reductant injected first exhaust gas feed and the second exhaust gas feed to form the modified main exhaust gas stream.

In another embodiment, a selective catalytic reduction system includes a decomposition tube coupled with a diesel engine through which an exhaust gas stream from the diesel engine is flowable. The system also includes a slipstream sleeve secured to an inner surface of the decomposition tube. The sleeve is axially aligned with the decomposition tube to create a separate slipstream channel within the decomposition tube such that a small portion of the exhaust gas stream is segregated from a remainder of the exhaust gas stream. The slipstream sleeve includes an entrance at one open end and an exit at an opposite open end. The small portion of the exhaust gas stream enters at the entrance, flows through the slipstream channel, and leaves through the exit. The system includes an injector coupled with the decomposition tube and configured to inject reductant fluid into the slipstream channel. Additionally, the system includes at least one exhaust gas heater disposed within the slipstream channel. The exhaust gas heater is configured to heat exhaust gas flowing through the slip stream channel. The system also includes an SCR catalyst coupled with the decomposition tube downstream of the slipstream sleeve Reference throughout this specification to features, advantages, or similar language does not imply that all of the features and advantages that may be realized with the subject matter of the present application should be or are in any single embodiment or implementation of the subject matter. Rather, language referring to the features and advantages is understood to mean that a specific feature, advantage, or characteristic described in connection with an embodiment is included in at least one embodiment of the subject matter of the present application. Discussion of the features and advantages, and similar language, throughout this specification may, but do not necessarily, refer to the same embodiment or implementation.

The described features, advantages, and characteristics of the subject matter of the present application may be combined in any suitable manner in one or more embodiments and/or implementations. One skilled in the relevant art will recognize that the present subject matter may be practiced without one or more of the specific features or advantages of a particular embodiment or implementation. In other instances, additional features and advantages may be recognized in certain embodiments and/or implementations that may not be present in all embodiments or implementations. These features and advantages of the subject matter of the present application will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
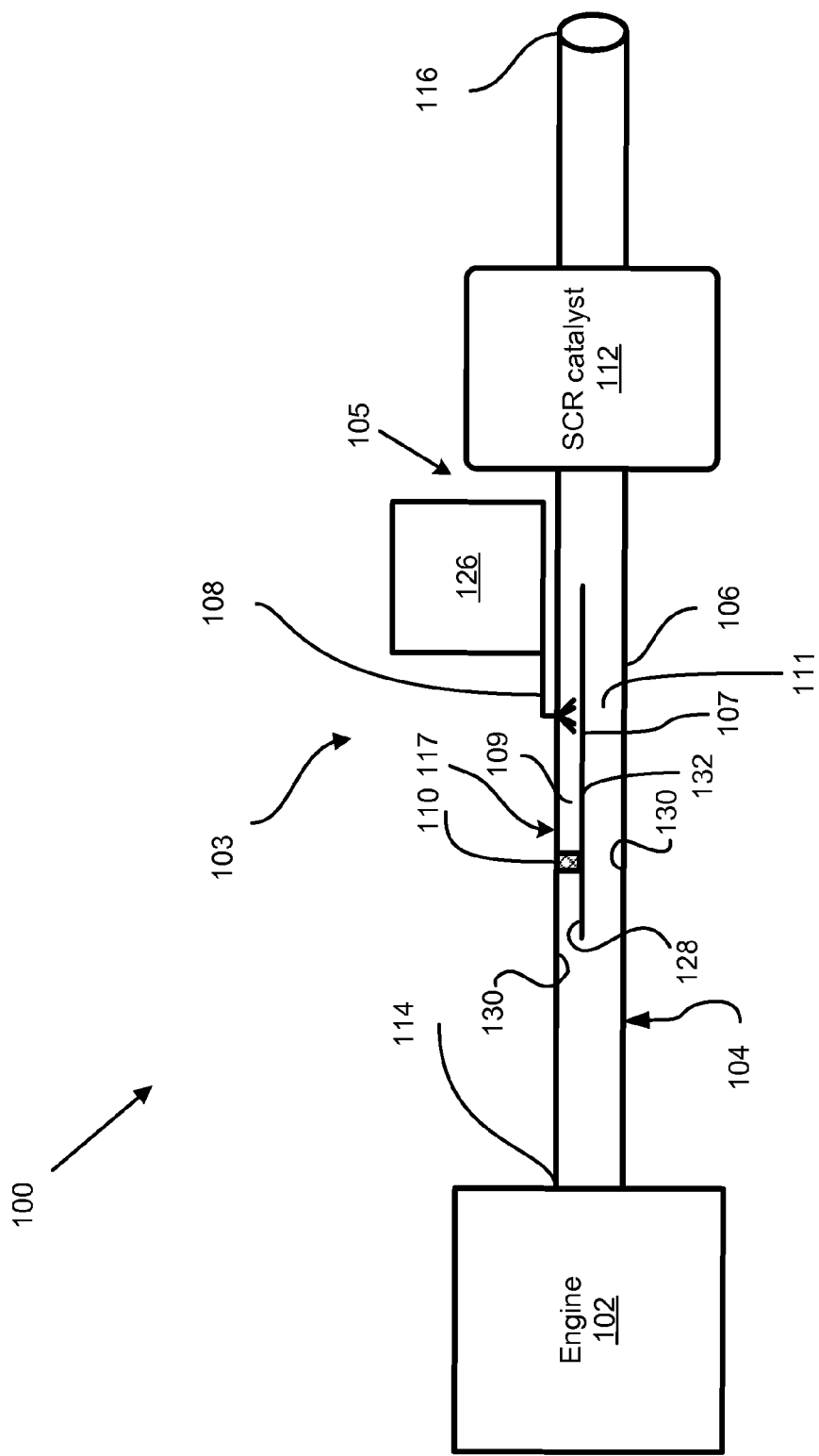
FIG. 1 is a schematic rendering of an engine system with an exhaust gas segregator according to one embodiment.

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present invention, however, absent an express correlation to indicate otherwise, an implementation may be associated with one or more embodiments.

In the following description, numerous specific details are provided to impart a thorough understanding of embodiments of the subject matter of the present application. One skilled in the relevant art will recognize, however, that the subject matter of the present application may be practiced without one or more of the specific details, or with other methods, components, materials, and so forth. In other instances, well-known structures, materials, or operations are not shown or described in detail to avoid obscuring aspects of the subject matter of the present application.

According to one embodiment, a schematically depicted engine system 100 includes an internal combustion engine 102 and an exhaust gas after-treatment system 103 in exhaust gas receiving communication with the engine. The exhaust gas after-treatment system 103 includes an exhaust gas line 104 through which exhaust gas is flowable from the engine 102 to an exit 116 of the after-treatment system.

Additionally, the exhaust gas after-treatment system 103 includes an SCR system 105 for reducing $NO_x$ emissions in the exhaust gas flowing through the after-treatment system 103. The SCR system 105 includes a decomposition tube 106, an exhaust flow segregator or separator 117, a reductant injector 108 in reductant receiving communication with a reductant reservoir 126, and an SCR catalyst 112. The decomposition tube 106 is defined as the length of the exhaust line 104 between the injection site of the injector 108 and the SCR catalyst 112. The exhaust flow segregator 117 includes a slipstream sleeve 107 and an exhaust heater 110. Also, the exhaust flow segregator 117 includes a slipstream channel 109 defined as an open-ended volume contained by an inner surface 128 of the slipstream sleeve 107 and an inner surface 130 of the exhaust line 104. Additionally, the SCR system 105 includes a bulk exhaust channel 111 defined as an open-ended volume contained by an outer surface 132 of the slipstream sleeve 107 and an inner surface 130 of the exhaust line 104.

The cross-sectional area of the slipstream channel 109 is substantially smaller than the cross-sectional area of the bulk exhaust channel 111 such that the volumetric flow rate of exhaust gas through the slipstream channel is substantially smaller than the volumetric flow rate of exhaust gas through the bulk channel. In certain embodiments, the cross-sectional area of the slipstream channel 109 is less than about 25% of the cross-sectional area of the main exhaust line 104 and the cross-sectional area of the bulk exhaust channel 111 is more than about 75% of the cross-sectional area of the exhaust line. Correspondingly, the volumetric flow rate of exhaust gas through the slipstream channel is less than about 25% of the volumetric flow rate of exhaust gas through the main exhaust line 104 and the volumetric flow rate of exhaust gas through the bulk exhaust channel 111 is greater than about 75% of the volumetric flow rate of exhaust gas through the main exhaust line. In certain implementations, the cross-sectional area of and volumetric flow rate of exhaust through the slipstream channel 109 is less than about 10% of the cross-sectional area of and volumetric flow rate of exhaust through the main exhaust line 104. Accordingly, in such certain implementations, the cross-sectional area of and volumetric flow rate of exhaust through the bulk exhaust channel 111 is greater than about 90% of the cross-sectional area of and volumetric flow rate of exhaust through the main exhaust line 104.

Although not shown, the exhaust gas after-treatment system 103 may include exhaust treatment components other than the SCR catalyst 112. For example, the exhaust gas after-treatment system 103 can include components upstream of the slipstream sleeve 107 (e.g., a diesel oxidation catalyst and/or particulate filter) and components downstream of the SCR catalyst 112 (e.g., an ammonia oxidation catalyst (AMOX)).

In operation, the engine 102 produces exhaust gas, which enters the exhaust gas line 104 at an entrance 114 of the exhaust gas after-treatment system 103. Although not shown, the exhaust may pass through an exhaust manifold before entering the exhaust gas line 104 through the entrance 114. After entering the exhaust gas line 104, the exhaust gas passes through the various components of the exhaust gas after-treatment system 103 if present, and then exits the after-treatment system at the exit 116. In the embodiment of FIG. 1, exhaust gas flowing from the engine 102 through the exhaust gas line 104 is separated at the slipstream sleeve 107 with a portion of the exhaust gas flowing through slipstream channel 109 and the remaining portion of exhaust gas flowing through the bulk exhaust channel 111. After passing through the slipstream channel 109 and bulk exhaust channel 111, the respective separated portions of the exhaust gas rejoin prior to entering the SCR catalyst 112.

The portion of the exhaust gas flowing through the slipstream channel 109 is defined as segregated exhaust gas feed while the portion of the exhaust gas flowing through the bulk exhaust channel 111 is defined as bulk exhaust gas feed. With the exhaust gas heater positioned within the slipstream channel 109, the segregated exhaust gas feed is heated by the exhaust gas heater 110 as it passes through the slipstream channel. After passing through the exhaust gas heater 110, the injector 108 sprays reductant into the heated, segregated exhaust gas feed. As the segregated exhaust gas feed flows through the slipstream channel 109, in certain embodiments (e.g., where the reductant is aqueous urea), the reductant at least partially, and in some cases, nearly completely, decomposes to ammonia before leaving the slipstream channel.

Because of the localized heating of a smaller portion of the entire exhaust gas feed by the heater 110, the temperature of the segregated exhaust gas feed can be controlled and maintained more effectively than attempting to heat the entire exhaust gas stream at once. More effective control and maintenance of the temperature of the exhaust gas reduces or even eliminates cold spots within the exhaust gas. Accordingly, reductant sprayed into the heated, segregated exhaust gas feed decomposes more thoroughly and consistently than had it been sprayed into the entire exhaust gas stream, whether the entire gas stream was heated or not. Additionally, the exhaust gas heater 110 is situated within the slipstream channel 109 and is needed to heat only the segregated exhaust gas feed. Because only the segregated exhaust gas feed (e.g., a smaller portion of exhaust gas) is heated, the exhaust gas heater 110 need only generate a smaller amount of heat compared to heaters used to heat an entire exhaust flow. Consequently, the exhaust gas heater 110 consumes less power and can be smaller in size than conventional heaters designed to heat the entire exhaust gas feed passing from the engine 102 through the exhaust gas line 104.

Following the reception of reductant, the segregated exhaust gas feed from the slipstream channel 109 rejoins the bulk exhaust gas feed exiting the bulk exhaust channel 111 to create a combined exhaust gas within the decomposition tube 106 upstream of the SCR catalyst 112. The combined exhaust gas then enters the SCR catalyst 112 where the decomposed components of the reductant (e.g., ammonia) in the exhaust gas reacts with the SCR catalyst 112 to reduce the amount of $NO_x$ present in the exhaust gas to less harmful emissions, such as $H_2O$ and $N_2$. In certain embodiments, the exhaust gas passes through subsequent treatment stations, such as an AMOX catalyst, after passing through the SCR catalyst 112.

Figure 2:
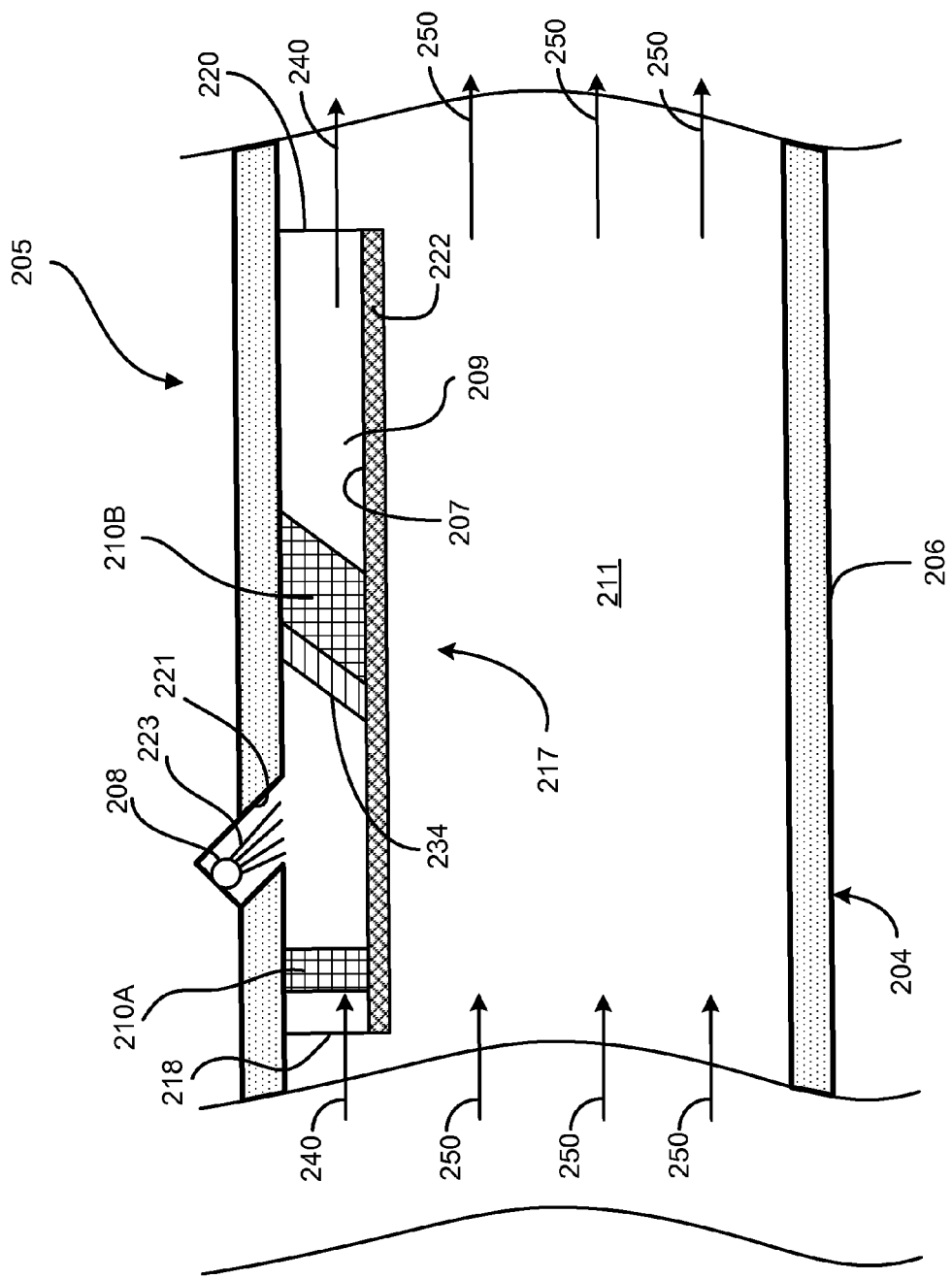
FIG. 2 is a cross-sectional side view of an exhaust gas segregator according to one embodiment.

According to one embodiment shown in FIG. 2, a slipstream sleeve 207 of an exhaust flow segregator 217 is positioned within an exhaust gas line 204. The exhaust flow segregator 217 is similar to the exhaust flow segregator 117, with like numbers referring to like elements. The slipstream sleeve 207 and a reductant decomposition tube 206 together define a slipstream channel 209 therebetween. The slipstream channel 209 has open inlet end 218 and an open outlet end 220 opposite the open inlet end. Segregated exhaust gas feed enters the slipstream channel 209 through the inlet end 218 and exits the slipstream channel through the outlet end 220. More specifically, the slipstream sleeve 207 acts to temporarily separate a portion 240 of exhaust gas from a main exhaust gas feed flowing through the exhaust gas line. Once the separated or segregated exhaust gas 240 has passed through the slipstream channel 209, the exhaust gas rejoins the remainder of exhaust gas (e.g., bulk exhaust gas feed 250) that has moved through a bulk exhaust channel 211 external to the slipstream channel 209.

In the illustrated embodiment, the slipstream channel 209 and the bulk exhaust channel 211 run parallel to each other, such that the segregated exhaust gas feed 240 that enters the slipstream channel 109 flows substantially parallel to the bulk exhaust gas feed 250 that flows through the bulk exhaust gas channel 211. In other words, the slipstream sleeve 207 can be positioned within and axially aligned with the exhaust gas line 204 to create the separate slipstream channel 209 within the exhaust gas line.

The slipstream sleeve 207 can be any of various shapes that define a slipstream channel 209 having any of various cross-sectional shapes. Generally, the slipstream sleeve 207 at least partially defines an elongate open-ended slipstream channel 209. In certain implementations, the slipstream channel 209 is substantially cylindrically-shaped with a substantially circular cross-sectional shape. In other implementations, the slipstream channel 209 is substantially half-cylindrically-shaped with a substantially half-circular cross-sectional shape (see, e.g., FIG. 3). In yet other implementations, the slipstream channel 209 is elongate with a cross-sectional shape corresponding to one of a triangular, ovular, rectangular, polygonal, square, or the like.

In certain embodiments, the slipstream channel 209 is defined between slipstream sleeve 207 and the exhaust gas line 204. In such embodiments, the slipstream sleeve 207 includes a relatively thin sheet (e.g., partition) shaped to define a portion of a channel. In certain implementations, the slipstream sleeve 207 is curved to form a generally arcuate cross-sectional shape (see, e.g., FIG. 3). The sheet includes two longitudinally extending ends each secured to an inner surface of the exhaust gas line. For example, referring to FIG. 3, the slipstream sleeve 307 includes two longitudinally extending sides 360, 362 that are secured to an inner surface 328 of an exhaust gas line 304. The longitudinally extending sides can be secured to the inner surface of an exhaust gas line using any of various techniques, such as, e.g., adhering, fastening, welding, and the like. In certain implementations, the coupling between the longitudinally extending sides and the inner surface of the exhaust gas line forms a seal to prevent the passage of exhaust gas between the slipstream channel and the bulk channel. When secured to the exhaust gas lines 204, 304 the respective open-ended slipstream channels 209, 309 are enclosed by the respective slipstream sleeves 207, 307 on one side and the inner surfaces 228, 328 of the respective exhaust gas lines 204, 204 on an opposite side.

In other embodiments, the slipstream channel is defined solely by the slipstream sleeve. For example, the slipstream sleeve can be an elongate tubular element having an endless cross-sectional shape. The tubular element can be secured to the inner surface of the exhaust gas line in the same or similar manner as the slipstream sleeves 207, 307 described above. However, whether the slipstream channel is defined between the slipstream sleeve and the exhaust gas line, or defined entirely within the slipstream sleeve, the segregated exhaust gas flow within the slipstream channel is temporarily separated and preferably sealed off from the bulk exhaust gas flow within the bulk exhaust gas channel.

The slipstream sleeve 207 may be made from a variety of materials. In one embodiment, the slipstream sleeve 207 is made from a bent piece of steel sheet which is welded axially to an inner surface 228 of the exhaust gas line 204. In this embodiment, the slipstream sleeve 107 can be substantially arcuate-shaped in cross-section (see FIG. 3). In some embodiments, the slipstream sleeve 207 is made from a ceramic material and may have a rectangular cross-sectional shape. One of skill in the art will recognize other materials from which the slipstream sleeve 207 can be made.

Figure 3:
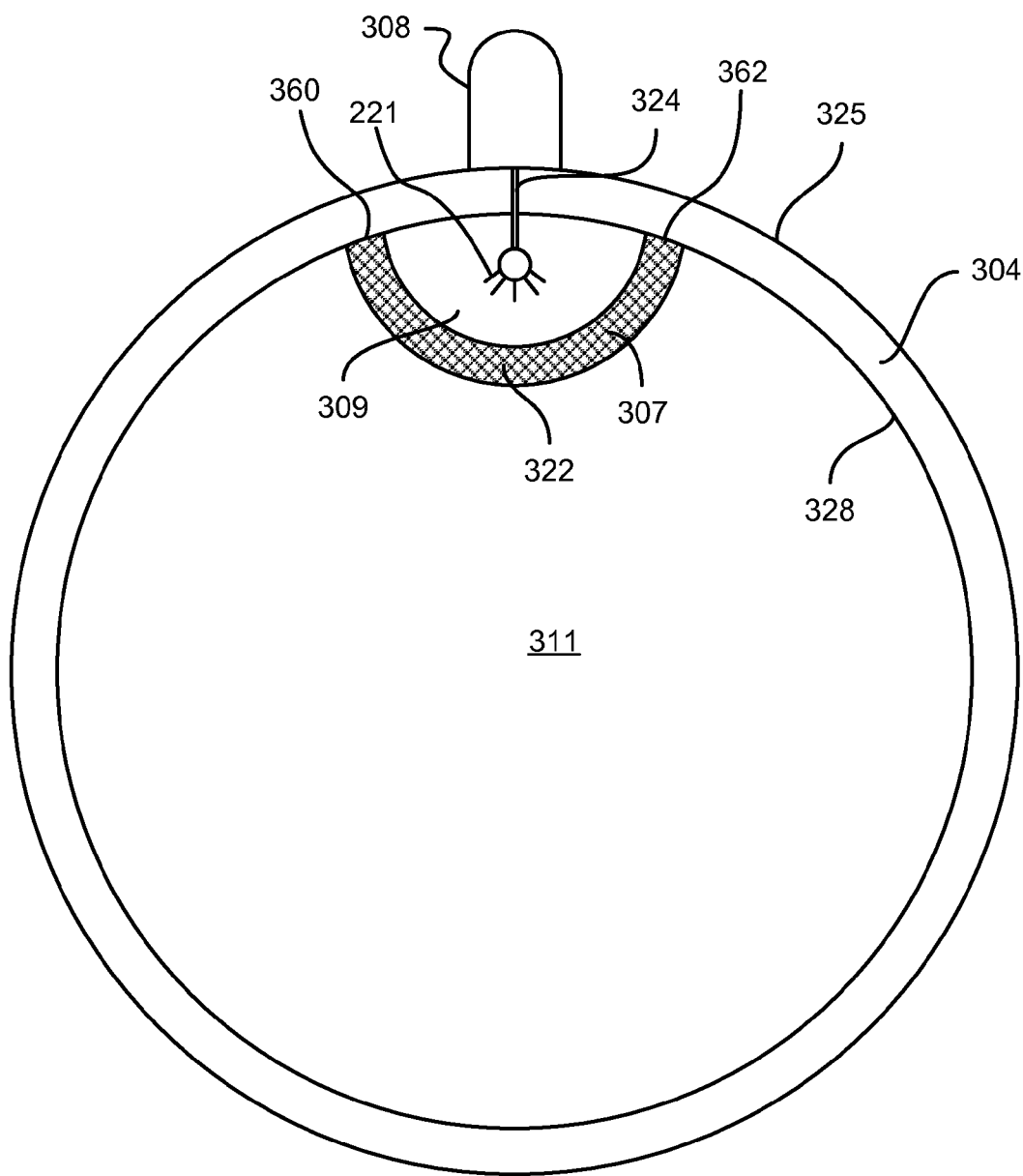
FIG. 3 is cross-sectional end view of an exhaust gas segregator according to another embodiment.

Referring again to FIG. 2, in certain embodiments, the slipstream sleeve 207 includes insulation 222 to reduce heat loss from the exhaust gas flowing through the slipstream channel 209 to exhaust gas flowing through the exhaust bulk channel 211. In other words, the insulation 222 acts to preserve the heat generated by the exhaust gas heaters 210A, 210B within the slipstream channel 209 by reducing heat transfer to the bulk exhaust channel 211. The insulation 222 may wrap around an outer periphery of the slipstream sleeve 207 as shown. Alternatively, if desired, the insulation 222 can be positioned within the slipstream channel 209, such as secured to an inner periphery of the slipstream sleeve 207. The insulation 222 may be separate from the slipstream sleeve 107 (as shown in FIGS. 2 and 3) or may be integrated into the material of the slipstream sleeve 107.

FIG. 1 schematically shows a single exhaust gas heater 110 within the slipstream channel 109. However, in other embodiments, more than one gas heater can be used. For example, as shown in FIG. 2, the exhaust flow segregator 217 includes two exhaust gas heaters 210A, 210B each disposed within the slipstream channel 209. The exhaust gas heater 210A is positioned between the entrance 218 of the slipstream channel 209 (e.g., the upstream end of the slipstream sleeve 207) and a reductant injector 208. In contrast, the exhaust gas heater 210B is positioned between the exit 120 of the slipstream channel 209 (e.g., the downstream end of the slipstream sleeve 207) and the injector 208. Similar to exhaust gas heater 110, the exhaust gas heaters 110A, 110B heat the segregated exhaust gas feed 240 as it flows through the slip stream channel 209. Like exhaust gas heater 110, the segregated exhaust gas feed 240 can be heated to a desired temperature for reductant decomposition by adjusting the temperatures of the exhaust gas heaters 210A, 210B. However, the use of two exhaust gas heaters 210A, 210B may, in some implementations, provide more precise control over the temperature increase of the segregated exhaust gas feed 240. Although in the illustrated embodiment, the segregator 217 includes two heaters 110A, 110B, in certain embodiments, more than two exhaust gas heaters may be necessary to heat the segregated exhaust gas feed 240 to a desired temperature.

The exhaust gas heater or heaters of the exhaust segregator disclosed herein can be positioned upstream and/or downstream of the reductant injector. In the embodiment of FIG. 1, a single exhaust gas heater 110 is located upstream of the injector 108. Similarly, the exhaust gas heater 210A is located upstream of the injector 208. Although not shown, in some embodiments, an exhaust gas segregator can include multiple exhaust gas heaters upstream of the reductant injector and no heaters downstream of the injector. In embodiments with upstream exhaust gas heaters, the segregated exhaust gas feed is heated before the reductant is sprayed into the feed by the injector. However, in some embodiments, the exhaust gas is heated by an exhaust gas heater after the reductant is sprayed into the segregated exhaust gas feed. For example, the exhaust gas heater 210B is located downstream of the injector 208 to heat the exhaust gas and reductant mix. In certain embodiments, such as the illustrated embodiment of FIG. 2, the segregator 217 has two exhaust gas heaters 210A, 210B with the injector 208 being positioned between the heaters. In this manner, the temperature of the segregated exhaust gas feed 240 may be increased before and/or after injection of the reductant. In yet some embodiments not shown, one or more exhaust gas heater can be positioned downstream of the reductant injector without any upstream exhaust gas heaters.

In some embodiments, a foam material 234, such as a metal foam, is positioned within the slipstream channel 209 upstream of the electrical heater 210B and downstream of the reductant injector 208. In certain implementations, the foam material 234 is adjacent the electrical heater 210B, and in other implementations, the foam material adjoins (e.g., is in physical contact with) the electrical heater 210B. The foam material 234 may be a highly conductive metal foam and, in certain embodiments, may be coated in a hydrolysis catalyst coating. In operation, the foam material 234 is heated by the electrical heater 210B when the electrical heater is in use. The heated foam material 234 effectively increases the surface area of the heater 210B. Because the segregated exhaust gas feed 240 flows through both the electrical heater 210B and the heated foam material 234, the segregated exhaust gas feed contacts a larger heated surface area. The increased heated surface area promotes an increase in the heat transferred to the segregated exhaust feed 240 as it flows through the slipstream channel 209.

In certain embodiments, the foam material 234 also functions as a reductant splatter-reducing feature. According to such embodiment, the injector 208 sprays reductant directly onto the foam material 234. Due to the porosity of the foam material 234, the splattering of reductant solution onto the walls defining the slipstream channel 209 is reduced. Also, portions of the reductant may be temporarily trapped in the foam material 234 after being sprayed from the injector 208. The trapped reductant may promote a more complete decomposition of the reductant due to the flow of heated, segregated exhaust gas through the foam material 234 and a potentially longer residence time.

FIGS. 2 and 3 show in more detail two embodiments of a reductant injector configuration. According to both embodiments, the injectors 208, 308 are coupled to the exhaust gas lines 204, 304, respectively, at a point where the decomposition tube (e.g., decomposition tube 206) begins. As discussed above, the injectors 208, 308 spray reductant fluid 221 into the slipstream channels 209, 309, respectively. In one embodiment, the reductant fluid 221 can be a diesel exhaust fluid, such as urea. Reductant injectors of the present disclosure may be configured to inject reductant from a location outside or inside of the immediate slipstream channel. For example, the injector 208 is positioned adjacent (e.g., just outside of) the slipstream channel 209 to spray the reductant 221 into the channel. In the illustrated embodiment, the injector 208 is positioned within a recess or cavity 223 formed in the wall defining the exhaust line 204. The injector 208 initially injects the reductant 221 into the recess 223, which is angled with respect to a direction of the slipstream feed 240. From the recess 223, the reductant 221 flows into the path of the slipstream feed 240. As shown in FIG. 3, the injector 308 includes a spray nozzle positioned within or inside of the slipstream channel 309 via a projection 324. Accordingly, the injector 308 injects reductant 221 directly into the slipstream feed 240 without passing through an exterior recess. In certain implementations, the injectors 208, 308 are configured to inject atomized particles of reductant into the slipstream channel.

As illustrated in FIGS. 1-3, the segregated exhaust channel may be much smaller than the bulk exhaust channel and located on a top portion of the exhaust gas line. However, one of skill in the art will recognize in view of this disclosure that the injector and the slipstream sleeve may be located on any surface of the exhaust gas line, including a bottom surface of the line.

Figure 4:
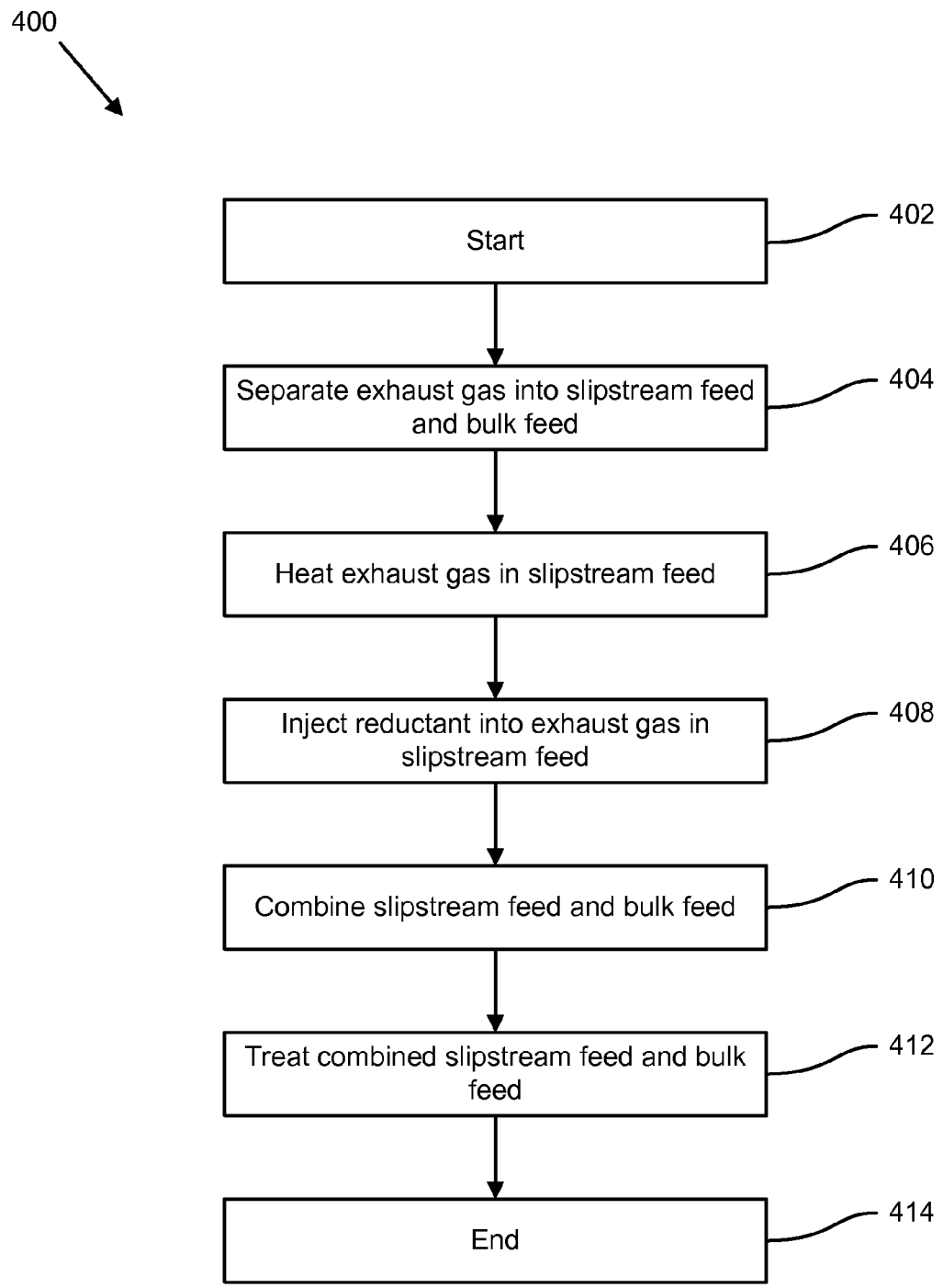
FIG. 4 is a method for treating exhaust gas according to one embodiment.

As shown in FIG. 4, a method 400 for treating exhaust gas substantially includes the steps to carry out the functions presented above with respect to the operation of the described apparatuses and systems of FIGS. 1-3. More specifically, the method starts 402 and exhaust gas flowing through an exhaust gas line is separated 404 into a slipstream feed and a bulk feed. The exhaust gas within the slipstream feed is heated 406. Reductant is injected 408 into the exhaust gas in the slipstream feed either before or after the slipstream feed is heated. After heating and injecting reductant into the exhaust gas in the slipstream feed, the slipstream feed and the bulk feed are combined 410. The combined slipstream and bulk feed is then treated 412 in an exhaust gas after-treatment device and the method 400 ends 414.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An exhaust gas after-treatment apparatus, comprising:
   an exhaust tube through which a main exhaust gas stream is flowable, the exhaust tube defining an exhaust flow channel having a constant cross-sectional area;
   an exhaust flow segregator positioned within the exhaust flow channel, the exhaust flow segregator separating the exhaust flow channel into a first channel through which a first fixed portion of the main exhaust gas stream is flowable and a second channel through which a second fixed portion of the main exhaust gas stream is flowable, the first and second channels being entirely contained within the exhaust tube;
   an injector coupled to the exhaust tube and communicable in reductant injecting communication with the first fixed portion of the main exhaust gas stream as the first fixed portion of the main exhaust gas stream flows through the first channel;
   a first electric exhaust gas heater positioned within the first channel upstream of the injector and communicable in heat supplying communication with the first fixed portion of the main exhaust gas stream upstream of the injector as the first fixed portion of the main exhaust gas stream flows through the first channel; and
   a second electric exhaust gas heater positioned within the first channel downstream of the injector and communicable in heat supplying communication with the first fixed portion of the main exhaust gas stream downstream of the injector as the first fixed portion of the main exhaust gas stream flows through the first channel.

2. The exhaust gas after-treatment apparatus of claim 1, wherein the exhaust flow segregator comprises a partition secured to an inner surface of the exhaust tube.

3. The exhaust gas after-treatment apparatus of claim 1, wherein the exhaust flow segregator comprises a thin elongate sheet having an upstream end, a downstream end, and two sides extending between the upstream and downstream ends, and wherein the two sides are secured to an inner surface of the exhaust tube such that the first channel is defined between the inner surface of the exhaust tube and a first surface of the sheet, and the second channel is defined between the inner surface of the exhaust tube and a second surface of the sheet.

4. The exhaust gas after-treatment apparatus of claim 3, wherein the first surface of the sheet comprises a concave surface and the second surface of the sheet comprises a convex surface.

5. The exhaust gas after-treatment apparatus of claim 1, wherein a cross-sectional area of the first channel is smaller than a cross-sectional area of the second channel.

6. The exhaust gas after-treatment apparatus of claim 1, further comprising a metallic foam element positioned within the first channel downstream of the injector and upstream of the second electric exhaust gas heater.

7. The exhaust gas after-treatment apparatus of claim 6, wherein the foam element is made from a thermally conductive material, the foam element being in thermal contact with the at least one exhaust gas heater.

8. The exhaust gas after-treatment apparatus of claim 6, wherein the foam element traps at least a portion of the reductant injected by the injector.

9. The exhaust gas after-treatment apparatus of claim 1, further comprising a layer of insulation coupled to the exhaust flow segregator and positioned between the first fixed portion of the main exhaust gas and the second fixed portion of the main exhaust gas to thermally insulate the first fixed portion of the main exhaust gas from the second fixed portion of the main exhaust gas.

10. An exhaust gas after-treatment system coupleable in exhaust gas receiving communication with an internal combustion engine, comprising:
an exhaust gas treatment device;
an exhaust gas line between the internal combustion engine and the exhaust gas treatment device, the exhaust gas line directing a main exhaust gas stream from the internal combustion engine to the exhaust gas treatment device;
a slipstream sleeve positioned within a portion of the exhaust gas line upstream of the exhaust gas treatment device and having a constant cross-sectional area, the slipstream sleeve defining a slipstream exhaust channel and bulk exhaust channel within the portion of the exhaust gas tube, wherein the slipstream sleeve divides the main exhaust gas stream into a fixed slipstream portion that passes through the slipstream exhaust channel and a fixed bulk portion that passes through the bulk exhaust channel;
first and second electric exhaust gas heaters positioned within the slipstream exhaust channel within the portion of the exhaust gas tube; and
a reductant injector positioned within the slipstream exhaust channel between the first and second electric exhaust gas heaters, the reductant injector being communicable in reductant injecting communication with exhaust gas as the exhaust gas flows through the slipstream exhaust channel within the portion of the exhaust gas tube.

11. The exhaust gas after-treatment system of claim 10, wherein the reductant injector comprises a nozzle positioned external to the slipstream channel.

12. The exhaust gas after-treatment system of claim 10, wherein the reductant injector comprises a nozzle positioned within the slipstream channel.

13. The exhaust gas after-treatment system of claim 10, wherein less than about 25% of the main exhaust gas stream flows through the slipstream channel.

14. The exhaust gas after-treatment system of claim 10, wherein the exhaust gas treatment device comprises a selective catalytic reduction catalyst, and wherein the reductant comprises urea.

15. A method for treating exhaust gas, comprising:
separating a main exhaust gas stream through an exhaust tube into first and second exhaust gas feeds within the exhaust tube, the exhaust gas tube having a constant cross-sectional area;
heating with a first electric heater the first exhaust gas feed within the exhaust tube to form a heated exhaust gas feed;
injecting a reductant into the heated exhaust gas feed within the exhaust tube to form a first heated exhaust gas and reductant feed;
heating with a second electric heater the heated exhaust gas and reductant feed to form a second heater exhaust gas and reductant feed;
combining the second heated exhaust gas and reductant feed and the second exhaust gas feed to form a modified main exhaust gas stream; and
treating the modified main exhaust gas stream.

16. The method of claim 15, further comprising fully decomposing the injected reductant in the first exhaust gas feed prior to combining the second heated exhaust gas and reductant feed and the second exhaust gas feed to form the modified main exhaust gas stream.

* * * * *